United States Patent
Kubo et al.

(10) Patent No.: US 11,317,290 B2
(45) Date of Patent: Apr. 26, 2022

(54) INFORMATION PROCESSING APPARATUS, SERVER, AND DATA TRANSMISSION SYSTEM

(71) Applicants: OMRON HEALTHCARE CO., LTD., Muko (JP); OMRON Corporation, Kyoto (JP)

(72) Inventors: Nobuo Kubo, Kyoto (JP); Toru Deno, Kyoto (JP); Hideki Kondo, Kyoto (JP)

(73) Assignees: OMRON HEALTHCARE CO., LTD., Kyoto (JP); OMRON CORPORATION, Kyoto (JP)

( * ) Notice: Subject to any disclaimer, the term of this patent is extended or adjusted under 35 U.S.C. 154(b) by 313 days.

(21) Appl. No.: 16/733,262

(22) Filed: Jan. 3, 2020

(65) Prior Publication Data
US 2020/0145832 A1 May 7, 2020

Related U.S. Application Data

(63) Continuation of application No. PCT/JP2018/028822, filed on Aug. 1, 2018.

(30) Foreign Application Priority Data

Aug. 9, 2017 (JP) .............................. JP2017-154760

(51) Int. Cl.
*G06F 11/00* (2006.01)
*G06F 12/14* (2006.01)
(Continued)

(52) U.S. Cl.
CPC ............. *H04W 12/12* (2013.01); *H04W 4/38* (2018.02); *H04W 12/04* (2013.01)

(58) Field of Classification Search
CPC ........ H04W 12/12; H04W 12/04; H04W 4/38
(Continued)

(56) References Cited

U.S. PATENT DOCUMENTS

| 2014/0115705 A1* | 4/2014 | Fujishima | ............... H04L 43/18 726/23 |
| 2015/0161371 A1* | 6/2015 | Hoshi | ..................... G06F 21/35 726/19 |

(Continued)

FOREIGN PATENT DOCUMENTS

| JP | 5852620 B2 | 2/2016 |
| JP | 2016-046651 A | 4/2016 |

(Continued)

OTHER PUBLICATIONS

English translation of Official Communication issued in International Patent Application No. PCT/JP2018/028822, dated Feb. 13, 2020.

(Continued)

*Primary Examiner* — Fatoumata Traore
*Assistant Examiner* — Samuel Ambaye
(74) *Attorney, Agent, or Firm* — Keating and Bennett, LLP

(57) ABSTRACT

According to one aspect of the present invention, an information processing apparatus includes a determination unit that determines whether an identifier extracted from a one-way communication packet received from a sensor includes a first value indicating another information processing apparatus as a legitimate destination, a second value indicating a user different from a user of the information processing apparatus as the legitimate destination, or a third value indicating a sensor different from a sensor associated with the information processing apparatus as an origination, and a transmission unit that transmits, to a server, a second packet in which the first, the second, or the third value is stored, if the identifier includes the first, the second, or the third value.

10 Claims, 7 Drawing Sheets

(51) Int. Cl.
  *G06F 12/16*   (2006.01)
  *G08B 23/00*   (2006.01)
  *H04W 12/12*   (2021.01)
  *H04W 4/38*    (2018.01)
  *H04W 12/04*   (2021.01)

(58) Field of Classification Search
  USPC .......................................................... 726/22
  See application file for complete search history.

(56)                References Cited

U.S. PATENT DOCUMENTS

2016/0029149 A1    1/2016  Morikawa et al.
2017/0070357 A1    3/2017  Kanayama et al.
2017/0357849 A1*  12/2017  Katsu ..................... G06F 3/011

FOREIGN PATENT DOCUMENTS

JP       2017-041770 A      2/2017
JP       2017-055171 A      3/2017
JP       2017-092694 A      5/2017
WO       2013/114465 A1     8/2013
WO       2016/027722 A1     2/2016

OTHER PUBLICATIONS

Official Communication issued in corresponding Japanese Patent Application No. 2017-154760, dated Apr. 20, 2021.
Official Communication issued in International Patent Application No. PCT/JP2018/028822, dated Oct. 23, 2018.

\* cited by examiner

| ID | Time | Sys | Dia | Pulse |

INFORMATION PROCESSING APPARATUS, SERVER, AND DATA TRANSMISSION SYSTEM

CROSS-REFERENCE TO RELATED APPLICATIONS

This application is a Continuation Application of PCT Application No. PCT/JP2018/028822, filed Aug. 1, 2018 and based upon and claiming the benefit of priority from Japanese Patent Application No. 2017-154760, filed Aug. 9, 2017, the entire contents of all of which are incorporated herein by reference.

FIELD

The present invention relates to security of communication between a sensor device and an information processing apparatus.

BACKGROUND

A blood pressure monitor having a function of transmitting blood pressure data to a mobile information device has already come onto the market. As a mobile information device, a smartphone, a tablet-type device, or a laptop personal computer is used, for example. With the use of such a function, a user can see measurement results of his or her own blood pressure in a list form on a mobile information device under various circumstances. For the transmission of the blood pressure data, a short-range wireless communication technology, particularly Bluetooth (trademark) technology, is typically used. Generally, a Bluetooth communication ("connection") can be realized in less space and with less energy, compared to a wireless local area network (WLAN) communication. Version 4.0 of the Bluetooth standard is also called Bluetooth Low Energy (BLE), and can further reduce consumed power compared to previous standards.

With BLE, it is possible to have a two-way communication called "connection". However, there are problems with this connection, for example: a user is burdened with a complicated operation required for pairing; a communication procedure after the pairing is complicated; BLE needs to be supported on the mobile information device side; high-spec hardware (processor, memory) is required not only by a mobile information device but also by a blood pressure monitor; cost of development and evaluation is expensive; and unsuitability for small-capacity data transmission due to large overheads in communication.

On the other hand, with BLE, it is also possible to perform a one-way communication called "advertising". Japan Patent No. 5852620 discloses a technique of including and transmitting optional data in a vacant area of a data field of an advertisement packet.

If blood pressure data is transmitted with the use of "advertising", the need for a pairing operation and a complicated communication procedure thereafter is negated; as a consequence, the aforementioned problems can be solved or mitigated. However, for example, if a blood pressure monitor is only equipped with a one-way transmission function, it is not possible to transmit control data from a mobile information device to the blood pressure monitor for the purposes of controlling the blood pressure monitor, or to refer to the status of the mobile information device (status of data receipt) from the blood pressure monitor side.

Generally, the data wirelessly transmitted from the blood pressure monitor can be received by a data receiving apparatus other than a mobile information device of a user of the blood pressure monitor, depending on a situation of radio wave propagation in the transmission. In this case, if the blood pressure data of the user is transmitted without being encrypted, the data is likely to be intercepted by others. To prevent such leakage of information containing user's health conditions, the enhancement of security in the function of transmitting blood pressure data is demanded. As mentioned above, if the blood pressure monitor is only equipped with a one-way transmission function, for example, the blood pressure monitor cannot refer to a status of data receipt at the mobile information device; accordingly, it may be necessary to transmit the data on a packet with a power greater than necessary, or to transmit unencrypted data, so as not to cause data loss in the mobile information device. In such cases, leakage of information relating to user health conditions tends to occur.

SUMMARY

According to a first aspect of the present invention, a data transmission system includes a server, a first information processing apparatus that communicates with the server, and a second information processing apparatus that communicates with the server. The first information processing apparatus includes a first reception unit that receives a first packet for a one-way communication from a sensor device, and extracts, from the first packet, sensor data and an identifier indicating an origination or a legitimate destination of the first packet, a determination unit that determines whether or not the identifier includes at least one of the following: a first value indicating an information processing apparatus different from the first information processing apparatus as the legitimate destination; a second value indicating a user different from a user of the first information processing apparatus as the legitimate destination; or a third value indicating a sensor device different from a first sensor device associated with the first information processing apparatus as the origination, a generation unit that generates a second packet in which at least one of the first value, the second value, or the third value is stored, if the identifier includes at least one of the first value, the second value, or the third value, and a transmission unit that transmits the second packet to the server. The server includes a reception unit that receives the second packet from the first information processing apparatus, and extracts data stored in a payload of the second packet, a determination unit that determines, if the data stored in the payload includes an identifier, whether the identifier includes at least one of the first value, the second value, or the third value, a generation unit that generates alert data for a user of the second information processing apparatus associated with at least one of the first value, the second value, or the third value, if the identifier includes at least one of the first value, the second value, or the third value, and a transmission unit that transmits the alert data to the second information processing apparatus. The alert data includes data used for an output to motivate a user of the second information processing apparatus to reinforce security regarding transmission of sensor data from a second sensor device associated with the second information processing apparatus. Thus, in this data transmission system, the first information processing apparatus can report to the server that an identifier stored in a packet for one-way communication received from the sensor device is inappropriate. Furthermore, since the server transmits alert data used for outputting, for example, alerts to the second information processing apparatus (which is a legitimate destination apparatus of the packet), it is thereby possible to motivate the user to take appropriate security measures for the sensor device, even if the sensor device, which is the origination of the packet, is equipped only with the a transmission function for one-way communication. In other words, if the sensor data is received by an illegitimate information processing apparatus, it is possible to alert a user of the legitimate destination apparatus.

According to a second aspect of the present invention, an information processing apparatus communicates with a server. The information processing apparatus includes a first reception unit that receives a first packet for a one-way communication from a sensor device, and extracts, from the first packet, sensor data and an identifier indicating an origination or a legitimate destination of the first packet, a determination unit that determines whether or not the identifier includes at least one of the following: a first value indicating an information processing apparatus different from the information processing apparatus as the legitimate destination; a second value indicating a user different from a user of the information processing apparatus as the legitimate destination; or a third value indicating a sensor device different from a sensor device associated with the information processing apparatus as the origination, a generation unit that generates a second packet in which at least one of the first value, the second value, or the third value is stored, if the identifier includes at least one of the first value, the second value, or the third value, and a transmission unit that transmits the second packet to the server. Thus, the information processing apparatus can report to the server if an identifier stored in a packet for one-way communication received from the sensor device is inappropriate. Furthermore, since the server transmits alert data used for outputting, for example, alerts to a legitimate destination apparatus of the packet, it is thus possible to motivate the user to take appropriate security measures for the sensor device, even if the sensor device, which is the origination of the packet, is equipped only with the a transmission function for one-way communication. In other words, if the sensor data is received by an illegitimate information processing apparatus, it is possible to alert a user of the legitimate destination apparatus.

According to a third aspect of the present invention, the information processing apparatus further includes a second reception unit that receives alert data from the server, and an output unit that performs, based on the alert data, an output for motivating a user of the information processing apparatus to reinforce security regarding transmission of sensor data from a sensor device associated with the information processing apparatus. Thus, according to the information processing apparatus, even if the sensor device associated with the information processing apparatus is equipped only with a transmission function for one-way communication, it is possible to motivate a user to take appropriate security measures for the sensor device.

According to a fourth aspect of the present invention, the alert data includes data used for an output which prompts a user input to enable encryption of the sensor data by a sensor device associated with the information processing apparatus, or change an encryption key or an encryption method used for the encryption. Thus, according to the information processing apparatus, even if the sensor device associated with the information processing apparatus is equipped only with a transmission function for one-way communication, it is possible to motivate a user to reinforce security by enabling encryption of sensor data by the sensor device or by changing an encryption key or an encryption method used for the encryption.

According to a fifth aspect of the present invention, the alert data includes data used for an output which prompts a user input to reduce transmission power used by a sensor device associated with the information processing apparatus to transmit the sensor data. Thus, according to the information processing apparatus, even if the sensor device associated with the information processing apparatus is equipped only with a transmission function for one-way communication, it is possible to motivate a user to reinforce security by enabling encryption of sensor data through reduction of transmission power used by the sensor apparatus to transmit sensor data.

According to a sixth aspect of the present invention, the sensor data includes biological data. —Thus, the information processing apparatus contributes to improvement of security in transmission of biological data, such as blood pressure data.

According to a seventh aspect of the present invention, a server communicates with a first information processing apparatus and a second information processing apparatus. The server includes a reception unit that receives a packet from a first information processing apparatus, and extracts data stored in a payload of the packet, a determination unit that determines, if the data stored in the payload includes an identifier, whether or not the identifier includes at least one of the following: a first value indicating an information processing apparatus different from the first information processing apparatus; a second value indicating a user different from a user of the first information processing apparatus; or a third value indicating a sensor device different from a first sensor device associated with the first information processing apparatus, a generation unit that generates alert data for a user of the second information processing apparatus associated with at least one of the first value, the second value, or the third value, if the identifier includes at least one of the first value, the second value, or the third value, and a transmission unit that transmits the alert data to the second information processing apparatus, wherein the alert data includes data used for an output to motivate a user of the second information processing apparatus to reinforce security regarding transmission of sensor data from a second sensor device associated with the second information processing apparatus. Thus, if an identifier stored in a one-way communication packet received from a first information processing apparatus is inappropriate, since the server transmits alert data used for outputting, for example, alerts to a legitimate destination apparatus of the packet, it is thereby possible to motivate the user to take appropriate security measures for the sensor device, even if the sensor device, which is the origination of the packet, is equipped only with the transmission function for one-way communication. In other words, if the sensor data is received by an illegitimate information processing apparatus, it is possible to alert a user of the legitimate destination apparatus.

According to an eighth aspect of the present invention, the alert data includes data used for an output which prompts a user input to change an encryption key or an encryption method for encryption of the sensor data by the second sensor device. Thus, according to the server, even if the second sensor device is equipped only with a transmission function for one-way communication, it is possible to motivate a user to reinforce security by enabling encryption of sensor data by the second sensor device or by changing an encryption key or an encryption method used for the encryption.

According to a ninth aspect of the present invention, the alert data includes data used for an output which prompts a user input to reduce the transmission power used by the second sensor device to transmit the sensor data. According to the server, even if the second sensor device is equipped only with a transmission function for one-way communication, it is possible to motivate a user to reinforce security by reducing the transmission power used by the second sensor device to transmit sensor data.

According to a tenth aspect of the present invention, the sensor data includes biological data. Thus, the server contributes to improvement of security in transmission of biological data, such as blood pressure data.

According to the present invention, if the sensor data is received by an illegitimate information processing apparatus, it is possible to alert a user of a legitimate destination apparatus.

DETAILED DESCRIPTION

Figure 1:
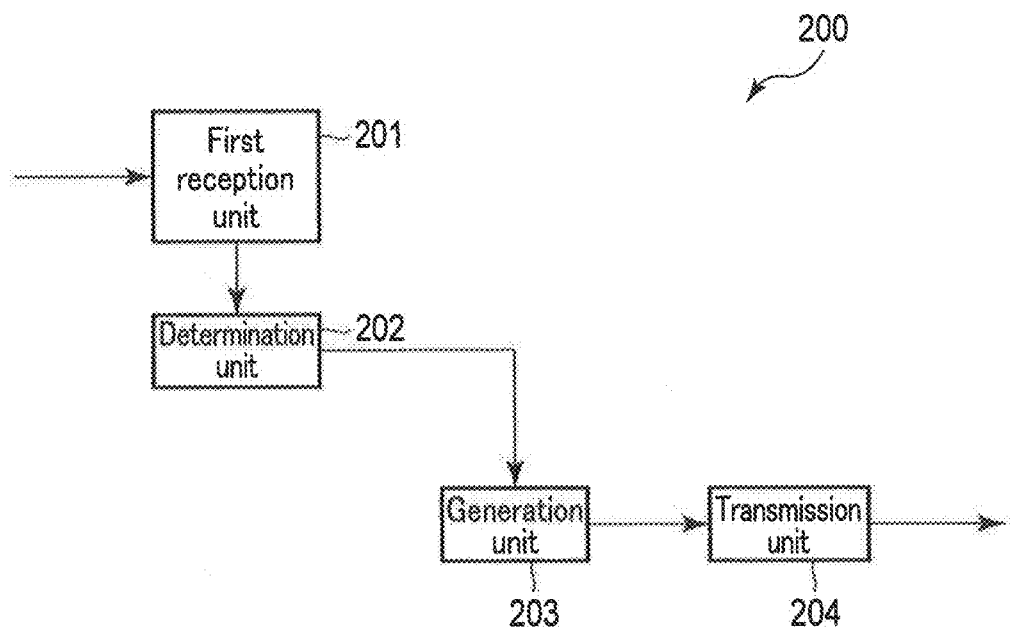
FIG. 1 is a block diagram showing an example of the application of an information processing apparatus according to an embodiment.

In the following, an embodiment of one aspect of the present invention (may be referred to as "the present embodiment" hereinafter) will be described with reference to the drawings.

According to the present embodiment, it is possible to alert a user of a legitimate destination-apparatus if sensor data is received by an illegitimate information processing apparatus.

Hereinafter, elements which are either the same as or similar to those described are referred to by the same or similar reference symbols, and overlapping descriptions will be basically omitted. For example, the same or similar elements may be referred to by the same reference symbol if no distinction is necessary, or additional reference numerals may be used in addition to the same reference symbol so as to distinguish the elements.

1. Example of Application

First, an example of application of the present invention will be described with reference to FIG. 1. FIG. 1 schematically shows an example of the application of an information processing apparatus 200 according to the present embodiment. The information processing apparatus 200 includes at least a first reception unit 201, a determination unit 202, a generation unit 203, and a transmission unit 204.

The first reception unit 201 receives a packet for one-way communication (described later) from a sensor device 100 (the origination of the packet), which is not shown in FIG. 1. This packet stores sensor data, date and time data associated with the sensor data, and an identifier indicating an origination or a legitimate destination of the packet. Specifically, the identifier indicates at least one of an origination device, a legitimate destination apparatus of the packet, or a user of the legitimate destination apparatus. The first reception unit 201 extracts the sensor data, the date and time data, and the identifier from the packet, and transmits them to the determination unit 202.

The determination unit 202 receives the sensor data, the date and time data, and the identifier from the first reception unit 201, and determines whether or not the information processing apparatus 200 is a legitimate destination apparatus of the one-way communication packet based on the identifier.

For example, the determination unit 202 determines that the information processing apparatus 200 is not a legitimate destination apparatus if the identifier includes at least one of the following values: a first value indicating an information processing apparatus different from the information processing apparatus 200 as a legitimate destination; a second value indicating a user different from a user of the information processing apparatus 200 as a legitimate destination; or a third value indicating a sensor device different from the sensor device 100 (not shown in FIG. 1) associated with the information processing apparatus 200 as an origination.

If the identifier stored in the received packet includes any of those values, this means that (the sensor data stored in) the packet is received by an illegitimate information processing apparatus. According to the present embodiment, in such a case, it is reported to the server 300 (not shown in FIG. 1) that the information processing apparatus 200 has received an inappropriate packet, and the reported server 300 alerts a user who is a legitimate destination of the packet.

If the determination unit 202 determines that the information processing apparatus 200 is not a legitimate destination apparatus of the one-way communication packet, the determination unit 202 transmits at least the identifier stored in the packet to the generation unit 203 in order to report this matter to the server 300.

The generation unit 203 receives the identifier from the determination unit 202, and generates a packet storing this identifier. This packet corresponds to a transmission packet in a mobile communication (e.g., 3G, 4G), or a WLAN, for example. The generation unit 203 transmits the generated packet to the transmission unit 204.

The transmission unit 204 receives the packet from the generation unit 203, and transmits it to the server 300 via a network. The transmission unit 204 uses a mobile communication or a WLAN, for example.

Figure 2:
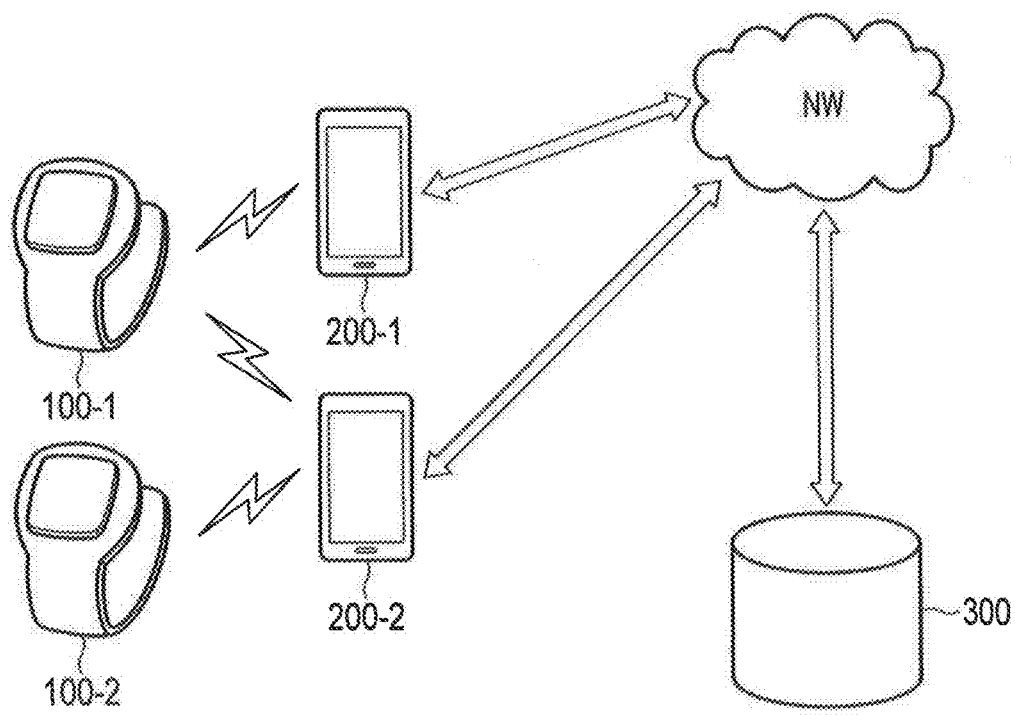
FIG. 2 is a drawing illustrating a data transmission system that includes a sensor device, an information processing apparatus, and a server according to the embodiment.

Specifically, the sensor device 100, the information processing apparatus 200, and the server 300 realize a data transmission system illustrated in FIG. 2. In other words, the sensor data measured by the sensor device 100 is first transmitted to the information processing apparatus 200 associated with the sensor device 100. Then, the sensor data gathered in each information processing apparatus 200 is integrated at the server 300. The example of FIG. 2 shows an appearance of a watch-type wearable blood pressure monitor as the sensor device 100; however, the sensor device 100 is not limited to this example, and the sensor device 100 may be an installation-type blood pressure monitor, or a sensor device that measures values relating to other biological information or activity information.

In the example shown in FIG. 2, the legitimate destination apparatus of an advertisement packet transmitted from the sensor device 100-1 is the information processing apparatus 200-1, and the legitimate destination apparatus of an advertisement packet transmitted from the sensor device 100-2 is the information processing apparatus 200-2.

Suppose the packet for one-way communication transmitted from the sensor device 100-1 is received by the information processing apparatus 200-2. In this case, the information processing apparatus 200-2 determines that the information processing apparatus 200-2 is not a legitimate destination apparatus of the received packet based on an identifier stored in the packet, and reports the identifier to the server 300. The server 300 specifies the information processing apparatus 200-1 as the legitimate destination apparatus of the packet received by the information processing apparatus 200-2 based on this identifier, and transmits alert data (later described) to the information processing apparatus 200-1 to alert the user.

As described above, if the information processing apparatus 200 determines that the information processing apparatus 200 itself is not a legitimate destination of a one-way communication packet received from the sensor device 100, the information processing apparatus 200 reports an identifier stored in the packet to the server 300. Furthermore, through the alert from the server 300 to the user of the legitimate destination of the packet, the user is prompted to, for example, enable encryption of sensor data, change an encryption key or encryption method used for encrypting, or reduce transmission power of the sensor device 100. Thus, even if the sensor device 100 is equipped only with a transmission function for one-way communication, it is possible for the user of the sensor device 100 to reinforce security in the sensor data transmission as needed.

2. Configuration Example

Figure 3:
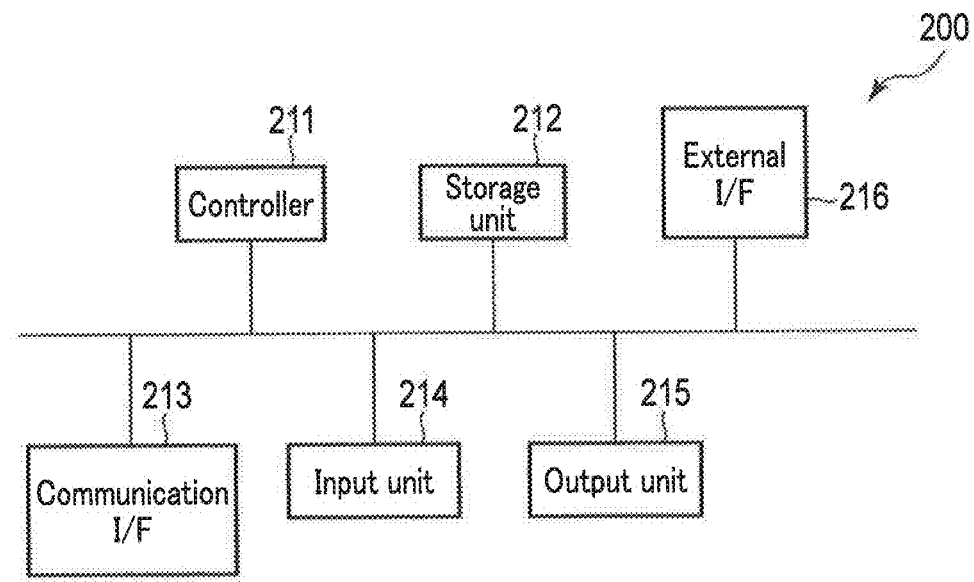
FIG. 3 is a block diagram illustrating a hardware configuration of the information processing apparatus according to the embodiment.

[Hardware Configuration]
<Information Processing Apparatus>
Next, an example of a hardware configuration of the information processing apparatus 200 according to the present embodiment will be described with reference to FIG. 3. FIG. 3 schematically shows an example of a hardware configuration of the information processing apparatus 200.

As shown in FIG. 3, the information processing apparatus 200 is a computer, typically a smartphone, in which a controller 211, a storage unit 212, a communication interface 213, an input device 214, an output device 215, and an external interface 216 are electrically connected to each other. In FIG. 3, the communication interface and the external interface are shown as "communication I/F" and "external I/F", respectively.

The controller 211 includes a central processing unit (CPU), a random access memory (RAM), a read only memory (ROM), etc. The CPU loads a program stored in the storage unit 212 onto the RAM. Then, when the CPU interprets and executes the program, the controller 211 can execute various kinds of information processing, for example the processing of the function blocks described later in the section of the functional configuration.

The storage unit 212 is a so-called "auxiliary storage device", and may be a built-in or external semiconductor memory such as a flash memory. The storage unit 212 stores a program executed by the controller 211, and data (for example, identifier, date and time data, sensor data, alert data) used by the controller 211. If the information processing apparatus 200 is a laptop or a desktop computer, the storage unit 212 may be a hard disk drive (HDD) or a solid state drive (SSD).

The communication interface 213 is, for example, a wireless communication module of various types, such as BLE, a mobile communication (3G, 4G, etc.), and a WLAN, and is an interface for performing a wireless communication via a network. The communication interface 213 may further include a wired communication module, such as a wired LAN module.

The input device 214 is a device for accepting user inputs, such as a touch screen, a keyboard, and a mouse. The output device 215 is a device for outputting, such as a display and a speaker.

The external interface 216 is an interface, such as a universal serial bus (USB) port or a memory card slot, for connections with an external apparatus.

Omission, replacement, or addition of an element can be made in the specific hardware configuration of the information processing apparatus 200 as appropriate, in accordance with an actual situation where the present embodiment is realized. For example, the controller 211 may include a plurality of hardware processors. The information processing apparatus 200 may be configured by a plurality of information processing apparatuses. Besides an information processing apparatus designed exclusively for provided services, a general-purpose desktop personal computer (PC), or a tablet PC may be used as the information processing apparatus 200.

Figure 4:
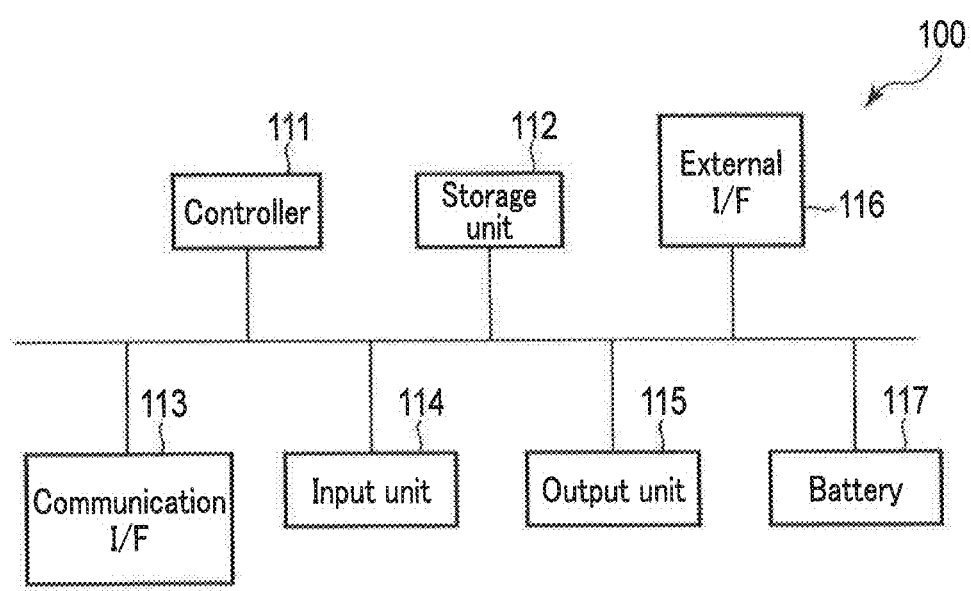
FIG. 4 is a block diagram illustrating a hardware configuration of the sensor device according to the embodiment.

<Sensor Device>
Next, an example of a hardware configuration of the sensor device 100 according to the present embodiment will be described with reference to FIG. 4. FIG. 4 schematically shows an example of a hardware configuration of the sensor device 100.

As shown in FIG. 4, the sensor device 100 is a computer in which a controller 111, a storage unit 112, a communication interface 113, an input device 114, an output device 115, an external interface 116, and a battery 117 are electrically connected to each other. The sensor device 100 is typically a sensor device that measures amounts relating to biological information or activity information of a user on a daily basis, such as a blood pressure monitor, a thermometer, an activity monitor, a pedometer, a body composition monitor, or a body weight scale. In FIG. 4, the communication interface and the external interface are shown as "communication I/F" and "external I/F", respectively.

The controller 111 includes a CPU, a RAM, or a ROM, etc. The CPU loads a program stored in the storage unit 112 onto the RAM. Then, when the CPU interprets and executes the program, the controller 111 can execute various kinds of information processing, for example the processing of the function blocks described later in the section of the functional configuration.

The storage unit 112 is a so-called auxiliary storage device, and may be a built-in or external semiconductor memory such as a flash memory, HDD, or SSD. The storage unit 112 stores a program executed by the controller 111, and data (for example, sensor data) used by the controller 111.

The communication interface 113 includes at least a wireless module capable of one-way communication, such as BLE. The input device 114 is a device for accepting user inputs, such as a touch screen, buttons or switches, and a sensor for detecting amounts relating to the biological information or activity information of the user. The output device 115 is an output device, such as a display and a speaker.

The external interface 116 is an interface, such as a USB port or a memory card slot, for connections with an external apparatus.

The battery 117 supplies electric power supply voltage to the sensor device 100. The battery 117 may be changeable. The sensor device 100 may be connectible to a commercial power source via an alternating current (AC) adapter. In this case, the battery 117 may be omitted.

Omission, replacement, or addition of an element can be made in the specific hardware configuration of the sensor device 100 as appropriate, in accordance with an actual situation where the present embodiment is realized. For example, the controller 111 may include a plurality of processors. The sensor device 100 may be configured by a plurality of sensor devices.

<Server>

Figure 5:
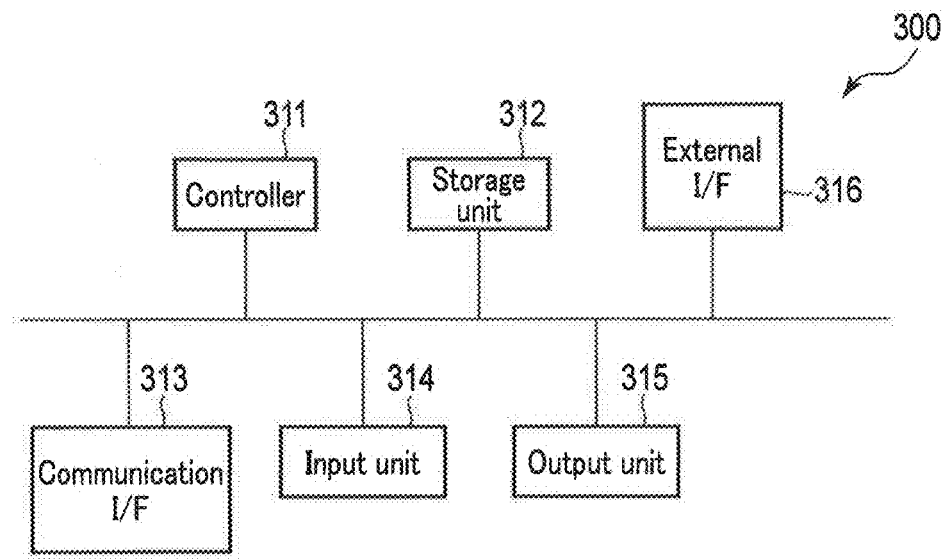
FIG. 5 is a block diagram illustrating a hardware configuration of the server according to the embodiment.

Next, an example of a hardware configuration of the server 300 according to the present embodiment will be described with reference to FIG. 5. FIG. 5 schematically shows an example of a hardware configuration of the server 300.

As shown in FIG. 5, the server 300 is a computer in which a controller 311, a storage unit 312, a communication interface 313, an input device 314, an output device 315, and an external interface 316 are electrically connected to each other. In FIG. 5, the communication interface and the external interface are shown as "communication I/F" and "external I/F", respectively.

The controller 311 includes a CPU, a RAM, or a ROM, etc. The CPU loads a program stored in the storage unit 312 onto the RAM. Then, when the CPU interprets and executes the program, the controller 311 can execute various kinds of information processing, for example the processing of the function blocks described later in the section of the functional configuration.

The storage unit 312 is a so-called auxiliary storage device, and may be a built-in or external HDD, SSD, or semiconductor memory (for example, a flash memory). The storage unit 312 stores a program executed by the controller 311, and data (for example, identifier, date and time data, sensor data, alert data) used by the controller 311.

The communication interface 313 is, for example, a wireless communication module such as a wireless LAN module and/or a wired communication module such as a wired LAN, and is an interface for performing a wireless communication via a network.

The input device 314 is a device for accepting user inputs, such as a touch screen, a keyboard, and a mouse. The output device 315 is an output device, such as a display and a speaker.

The external interface 316 is an interface, such as a USB port or a memory card slot, for connections with an external apparatus.

Omission, replacement, or addition of an element can be made in the specific hardware configuration of the server 300 as appropriate, in accordance with an actual situation where the present embodiment is realized. For example, the controller 311 may include a plurality of processors. The server 300 may be configured by a plurality of information processing apparatuses. Besides an information processing apparatus designed exclusively for provided services, a general-purpose desktop PC, etc. may be used as the server 300.

[Functional Configuration]

<Information Processing Apparatus>

Figure 6:
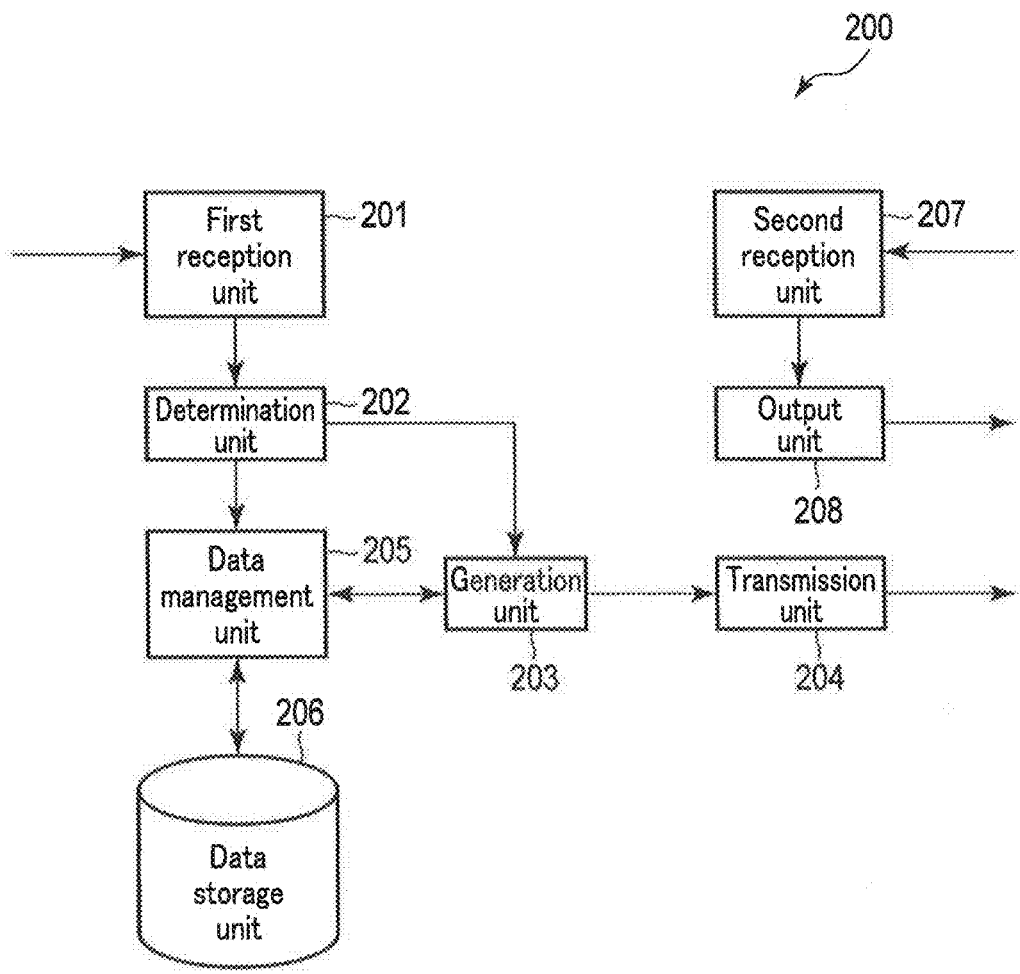
FIG. 6 is a block diagram illustrating a functional configuration of the information processing apparatus according to the embodiment.

Next, an example of a functional configuration of the information processing apparatus 200 according to the present embodiment will be described, with reference to FIG. 6. FIG. 6 schematically shows an example of a functional configuration of the information processing apparatus 200.

The controller 211 shown in FIG. 3 loads a program stored in the storage unit 212 on the RAM. Then, the controller 211 interprets and executes, courtesy of the CPU, the program to control each hardware element shown in FIG. 3. Thus, as shown in FIG. 6, the information processing apparatus 200 functions as a computer having a first reception unit 201, a determination unit 202, generation unit 203, a transmission unit 204, a data management unit 205, a data storage unit 206, a second reception unit 207, and an output unit 208.

The first reception unit 201 receives a packet that includes, for example, sensor data, and date and time data associated with the sensor data, from the sensor device 100 associated with the information processing apparatus 200 or other sensor device. This packet is an advertisement packet in BLE, for example. In the future, however, BLE may be replaced with a communication standard capable of lower power consumption and one-way communication. In such a case, the descriptions hereinafter can be read mutatis mutandis.

Herein, the advertising packet in BLE is schematically explained.

Figure 7:
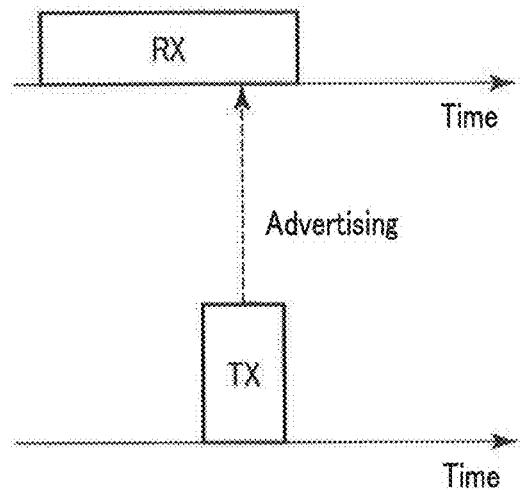
FIG. 7 is an explanatory drawing of "advertising" performed in BLE.

In a passive scan scheme adopted in BLE, as illustrated in FIG. 7, a new node periodically transmits an advertisement packet informing its existence. This new node enters a sleep state for low-power consumption after transmitting an advertisement packet and before transmitting a next one, so as to save power. Since the receiver side of the advertisement packet also intermittently operates, power consumed for transmitting and receiving the advertisement packet is very small.

Figure 8:
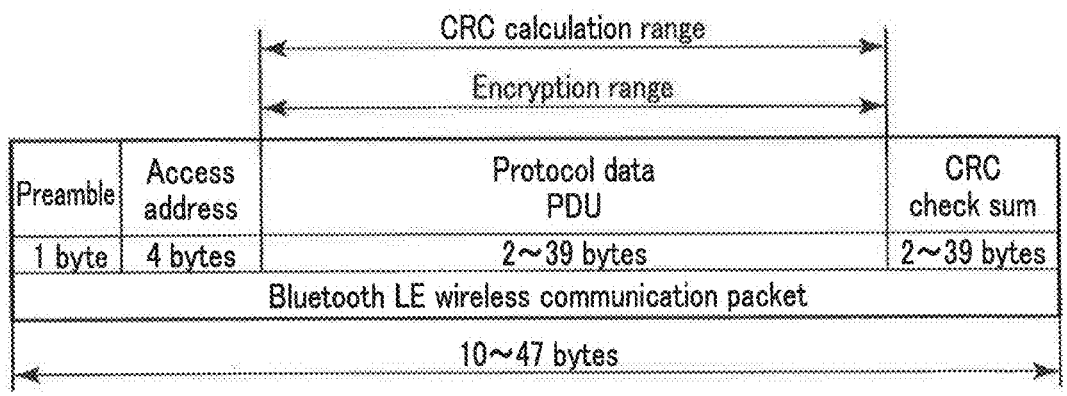
FIG. 8 is a drawing illustrating a data structure of a packet transmitted and received in BLE.

FIG. 8 shows a basic structure of a BLE wireless communication packet. The BLE wireless communication packet includes a 1-byte preamble, a 4-byte access address, a 2- to 39-byte (variable) protocol data unit (PDU), and a 3-byte cyclic redundancy checksum (CRC). A length of the BLE wireless communication packet is dependent on a length of a PDU, and falls between 10 to 47 bytes. The 10-byte BLE wireless communication packet (PDU is 2 bytes) is sometimes called "empty PDU packet", and is regularly exchanged between a master and a slave.

A preamble field is prepared for synchronization of a BLE wireless communication, and repetition of "01" or "10" is stored therein. An access address stores a fixed value for an advertising channel, and stores a random number for a data channel. In the present embodiment, an advertisement packet which is a BLE wireless communication packet transmitted over an advertising channel is targeted. A CRC field is used to detect a reception error. The calculation range of the CRC is a PDU field only.

Figure 9:
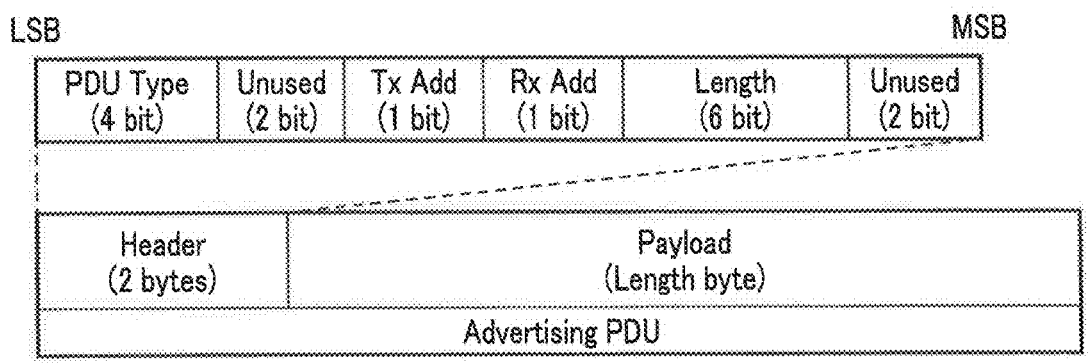
FIG. 9 is a drawing illustrating a data structure of a PDU field of an advertisement packet.

Next, a PDU field of the advertisement packet will be described with reference to FIG. 9. The PDU field of the data communication packet, which is a BLE wireless communication packet transmitted over a data channel has a data structure different from that shown in FIG. 9; however, since the data communication packet is not a target in the present embodiment, the description of the data structure is omitted.

The PDU field of the advertisement packet includes a 2-byte header, and a 0- to 37-byte (variable) payload. The header further includes a 4-bit PDU Type field, a 2-bit unused field, a 1-bit TxAdd field, a 1-bit RxAdd field, a 6-bit Length field, and a 2-bit unused field.

In the PDU Type field, a value indicating a type of this PDU is stored. Some values, such as "connectible advertising" and "non-connectible advertising" are defined in advance. In the Tx-Add field, a flag indicating whether or not a transmit address is included in the payload is stored. Similarly, a flag indicating whether or not a receive address is included in the payload is stored in the RxAdd field. In the Length field, a value indicating a byte size of the payload is stored.

Any data can be set in a payload as appropriate. Accordingly, the sensor device 100 stores an identifier, date and time data, and sensor data in a payload, with the use of a data structure like the one illustrated in FIG. 10, for example. The data structure shown in FIG. 10 can be used for transmitting sensor data of a single measurement result of a blood pressure and a pulse rate of a single user. The data structure shown in FIG. 10 may be altered so as to transmit sensor data of multiple measurement results.

In the ID field, an identifier is stored. As aforementioned, the identifier indicates at least one of an origination device or a legitimate destination apparatus of the packet, or a user of the device. In the data structure shown in FIG. 10, the number of the ID fields is one; however, the number may increase to two or more, depending on the number of stored identifiers.

In the Time field, the date and time data is stored. In the Sys, Dia, and Pulse fields, data of systolic blood pressure, diastolic blood pressure, and pulse rate, each associated with the date and time data, are respectively stored. Thus, there may be one or more kinds of sensor data associated with the date and time data.

Returning to the description of the functional configuration of the information processing apparatus 200, the first reception unit 201 extracts a payload of the PDU from an advertisement packet of BLE. The first reception unit 201 transmits the extracted sensor data, date and time data, and identifier to the determination unit 202.

The determination unit 202 receives the sensor data, the date and time data, and the identifier from the first reception unit 201, and determines whether or not the information processing apparatus 200 is a legitimate destination apparatus of the received advertisement packet based on the identifier. Specifically, the determination unit 202 can refer to a value of an appropriate identifier, and make a determination depending on whether or not a value of the identifier received from the first reception unit 201 matches the value of this appropriate identifier. In other words, the determination unit 202 realizes this determination by comparing a value of the identifier indicating an origination of the packet with a value indicating the sensor device 100; comparing a value of the identifier indicating a legitimate destination apparatus of the packet with a value indicating the information processing apparatus 200; or comparing a value-indicating user of a legitimate destination apparatus of the packet with a value indicating a user of the information processing apparatus 200.

Although an identifier stored in the received advertisement packet is dependent on a data structure of the packet, it is assumed that the identifier includes the information necessary for directly or indirectly indicating a legitimate destination of a packet, namely at least one of an origination apparatus of the packet, a legitimate destination apparatus, or a user thereof. If multiple identifiers are stored in the received advertisement packet, it is necessary for the determination unit 202 to determine whether or not all the identifiers are appropriate. For example, even if the identifier indicating an origination apparatus of the packet is appropriate whereas an identifier indicating a legitimate destination apparatus or a user thereof is not appropriate, the determination unit 202 determines that the information processing apparatus 200 is not a legitimate destination apparatus of the received advertisement packet.

The determination unit 202 transmits the date and time data and the sensor data to the data management unit 205 if it is determined that the information processing apparatus 200 is a legitimate destination apparatus of the received advertisement packet. On the other hand, the determination unit 202 transmits at least the identifier to the generation unit 203, if the determination unit 202 determines that the information processing apparatus 200 is not a legitimate destination apparatus of the received advertisement packet, in other words, the identifier includes at least one of the following values: a first value indicating an information processing apparatus different from the information processing apparatus 200 as a legitimate destination; a second value indicating a user different from a user of the information processing apparatus 200 as a legitimate destination; or a third value indicating a sensor device different from the sensor device 100 (not shown in FIG. 1) as an origination.

When it is determined that the information processing apparatus 200 is not a legitimate destination apparatus of the received advertisement packet, the determination unit 202 may transmit to the generation unit 203 the date and time data and the sensor data in addition to the identifier. Since the date and time data and the sensor data are transmitted to the server 300 in addition to the identifier, in case a legitimate destination apparatus has not received the date and time data and the sensor data, the loss of the date and time data and sensor data can be compensated by the server 300.

The generation unit 203 receives from the determination unit 202 the identifier stored in the advertisement packet received by the information processing apparatus 200 as a legitimate destination apparatus. Then the generation unit 203 generates a packet in which this identifier is stored in a payload and an identifier indicating the information processing apparatus 200 is stored in a header, and transmits the packet to the transmission unit 204.

The generation unit 203 receives, from the data management unit 205, the date and time data and the sensor data stored in the advertisement packet received by the information processing apparatus 200 as a legitimate destination apparatus. Then, the generation unit 203 generates a packet in which this date and time data and sensor data are stored in a payload and an identifier indicating the information processing apparatus 200 is stored in a header, and transmits the packet to the transmission unit 204.

The transmission unit 204 receives the packet from the generation unit 203, and transmits it to the server 300 via a network. The transmission unit 204 uses a mobile communication or a WLAN, for example.

The data management unit 205 receives the date and time data and sensor data from the determination unit 202, and writes these data items being associated with each other into the data storage unit 206. The data management unit 205 reads a set of the date and time data and the sensor data stored in the data storage unit 206 in accordance with an instruction from an upper-layer application (not shown), such as an application of biological data management, and transmits the data set to the generation unit 203 or a display (not shown).

In the data storage unit 206, the set of the date and time data and the sensor data is read and written by the data management unit 205.

The second reception unit 207 receives alert data from the server 300 via a network. The second reception unit 207 transmits the alert data to the output unit 208.

The alert data is data used for an output (for example, texts, images, or sound) to motivate the user of the information processing apparatus 200 to reinforce the security regarding the transmission of the sensor data from the sensor device 100 associated with the information processing apparatus 200. The alert data may include data to be actually output itself. The alert data may data that specifies data to be actually output, for example, an index that specifies a message.

Specifically, the alert data may include data used for an output which prompts a user input to enable encryption of the sensor data by the sensor device 100, or to change an encryption key or an encryption method used for the encryption. The alert data may include data used for an output which prompts a user input to reduce the transmission power of the sensor device 100 applied to the transmission of the sensor data.

Furthermore, the alert data may include data used for outputting data indicating an operation procedure that the user is requested to perform to enable encryption of sensor data by the sensor device 100, change an encryption key or an encryption method used for the encryption, or reduce transmission power of the sensor device 100 applied to the transmission of the sensor data. Such an output based on the alert data can save the user from having to check the manual of the sensor device 100.

Alternatively, the alert data may be simply data used for notifying the user of the information processing apparatus 200 that the sensor data transmitted by the sensor device 100 associated with the information processing apparatus 200 is received by an information processing apparatus different from the information processing apparatus 200. Such an output based on the alert data can motivate the user accustomed to the operation to reinforce the security regarding the transmission of the sensor data, without making the user feel redundant.

The output unit 208 receives the alert data from the second reception unit 207, and performs the output based on the alert data. The user who perceives the output based on the alert data is prompted to, through operating the sensor device 100, enable encryption of sensor data, change the encryption key or method used for the encryption, or reduce transmission power.

<Sensor Device>

Figures 10, 11:
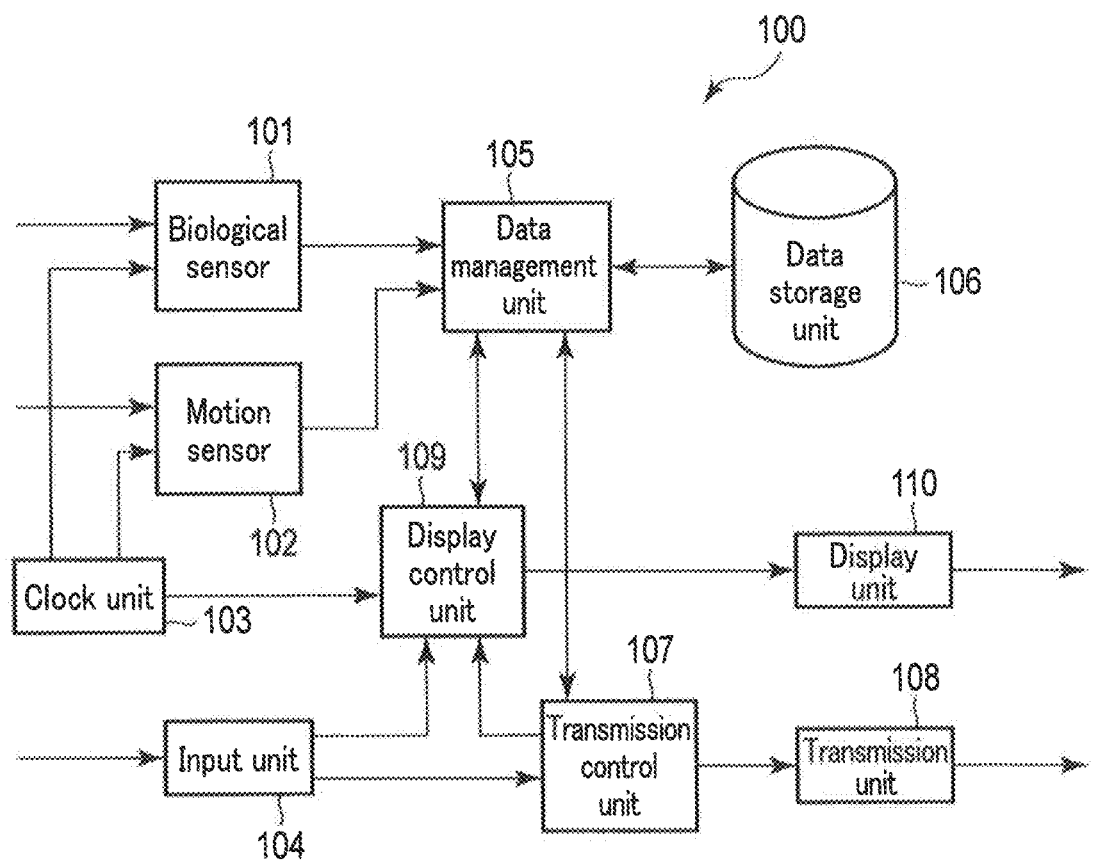
FIG. 10 is a drawing illustrating data stored in a payload of a PDU field of a packet received by the information processing apparatus according to the embodiment.
FIG. 11 is a block diagram illustrating a functional configuration of the sensor device according to the embodiment.

Next, an example of a functional configuration of the sensor device 100 according to the present embodiment will be described, with reference to FIG. 11. FIG. 11 schematically shows an example of a functional configuration of the sensor device 100.

The controller 111 shown in FIG. 4 loads a program stored in the storage unit 112 on the RAM. Then, the controller 111 interprets and executes, courtesy of the CPU, the program to control each hardware element shown in FIG. 4. Thus, as shown in FIG. 11, the sensor device 100 functions as a computer having a biological sensor 101, a motion sensor 102, a clock unit 103, an input unit 104, a data management unit 105, a data storage unit 106, a transmission control unit 107, a transmission unit 108, a display control unit 109, and a display unit 110.

The biological sensor 101 measures quantities relating to a user's biological information to obtain biological data. The operation of the biological sensor 101 is controlled by a sensor controller (not shown), for example. The biological sensor 101 associates the biological data with the date and time data received from the clock unit 103, and transmits it to the data management unit 105. The biological sensor 101 typically includes a blood pressure monitor that obtains blood pressure data by measuring a blood pressure of the user. In this case, the biological data includes blood pressure data. The blood pressure data may include values of a systolic blood pressure, a diastolic blood pressure, and a pulse rate, but not limited thereto. Other than this, the biological data may include electrocardiogram data, pulse wave data, and body temperature data.

The blood pressure sensor can include a blood pressure sensor capable of continuously measuring a user's blood pressure on a beat-by-beat basis (hereinafter, this may be referred to as a "continuous-type blood pressure sensor"). The continuous-type blood pressure sensor may continuously measure a user's blood pressure from a pulse transit time (PTT), or realize continuous measurement with tonometry or some other technique.

The blood pressure sensor may include a blood pressure sensor incapable of continuous measurement (which may be referred to as a "non-continuous-type blood pressure sensor") instead of, or in addition to, the continuous-type blood pressure sensor. A discontinuous blood pressure sensor measures the user's blood pressure using, for example, a cuff as a pressure sensor (oscillometric method).

Discontinuous blood pressure sensors (in particular, oscillometric blood pressure sensors) tend to provide a higher degree of measurement precision than that provided by continuous blood pressure sensors. For this reason, for example, when a certain condition is satisfied (for example, when a user's blood pressure data measured by the continuous-type blood pressure sensor suggests a predetermined condition), the blood pressure sensor operates the non-continuous-type blood pressure sensor, instead of the continuous-type blood pressure, to measure blood pressure data with high accuracy.

The motion sensor 102 may be an acceleration sensor or a gyro sensor, for example. The motion sensor 102 obtains an acceleration/angular velocity data of three axes by detecting the acceleration/angular velocity acting on the motion sensor 102. The operation of the motion sensor 102 is controlled by a sensor controller (not shown), for example. The acceleration/angular velocity data may be used to estimate an activity status (body position and/or action) of a user who wears the sensor device 100. The motion sensor 102 associates the acceleration/angular velocity data with the date and time data received from the clock unit 103, and transmits it to the data management unit 105.

Either one of the biological sensor 101 or the motion sensor 102 may be omitted. In addition to, or instead of, the biological sensor 101 and the motion sensor 102, an environment sensor may be provided. The environment sensor may include, for example, a temperature sensor, a humidity sensor, or an atmospheric pressure sensor. In other words, the sensor data may be any data generated based on a measurement result of a predetermined physical quantity by the sensor.

The clock unit 103 indicates date and time. The clock unit 103 includes, for example, a crystal oscillator that oscillates at a fixed frequency, a divider circuit for obtaining a signal of 1 Hz by dividing an output from the oscillator, and a counter that obtains a serial value indicating a data or time by counting the signal. The clock unit 103 transmits the date and time data indicating a current date and time (for example, the above serial value) to the biological sensor 101 and the motion sensor 102. The date and time data may be used as date and time of the biological data measurement by the biological sensor 101, or date and time of the acceleration/angular velocity data measurement by the motion sensor 102. Other than this, the date and time data may be referred to by the display control unit 109 so that the date and time is displayed on the display unit 110.

Although (the serial value held by) the clock unit 103 may be designed to be adjustable (clock setting) through a user input, such a design is not necessarily adopted, and the input device 114 may be simplified (e.g., reduction of number of buttons). Even in such a case, it is still possible to present time and date relative to current date and time, such as "ten minutes ago", "two hours ago", "yesterday", "a week ago", to the user.

The input unit 104 accepts a user input. The user input is, for example, for controlling the data transmission by the transmission unit 108, for controlling the data display by the display unit 110, or for initiating the measurement by the biological sensor 101 or the motion sensor 102.

The user input for controlling the data transmission from the transmission unit 108 may be the following: explicit or implicit instruction to enable encryption of sensor data or change an encryption key or method for the encryption; explicit or implicit instruction to transmit a specific set of date and time data and sensor data; or explicit or implicit instruction to increase or reduce transmission power.

The input unit 104 transmits the following: the user input for controlling the data transmission by the transmission unit 108 to the transmission control unit 107; the user input for controlling the data display by the display unit 110 to the display control unit 109; and the user input for initiating the measurement by the biological sensor 101 or the motion sensor 102 to a sensor controlling unit (not shown).

The data management unit 105 receives sensor data (biological data or acceleration/angular velocity data) associated with the date and time data from the biological sensor 101 or the motion sensor 102, and writes the sensor data into the data storage unit 106. If the data management unit 105 newly receives the date and time data and the sensor data, the data management unit 105 may automatically transmit the data to the transmission control unit 107 or the display control unit 109. Upon receipt of an instruction from the transmission control unit 107 or the display control unit 109, the data management unit 105 may read the set of date and time data and sensor date stored in the data storage unit 106, and transmit it to the transmission control unit 107 or the display control unit 109.

In the data storage unit 106, the set of date and time data and sensor data is read and written by the data management unit 105.

The transmission control unit 107 receives the set of date and time data and sensor data from the data management unit 105, and generates an advertisement packet of BLE like the one above-described with reference to FIGS. 8 to 10, based on the data set. The transmission control unit 107 may encrypt the sensor data stored in the advertisement packet. The transmission control unit 107 transmits the generated advertisement packet to the transmission unit 108. Furthermore, the transmission control unit 107 controls the transmission power of the transmission unit 108.

The transmission control unit 107 may receive, from the input unit 104, a user input for controlling the transmission of data by the transmission unit 108. In this case, the transmission control unit 107 enables encryption of sensor data, changes an encryption key or method used for the encryption, increases or reduces transmission power set in the transmission unit 108, or requests a specific set of date and time data and sensor data from the data management unit 105 based on a user input. The encryption key or method after its change may be determined automatically by the sensor device 100, or designated by a user input. Furthermore, the transmission control unit 107 may generate an advertisement packet regardless of a user input, in order to re-transmit data transmitted in the past, or to notify approximately the latest date and time data.

The transmission unit 108 receives the advertisement packet of BLE from the transmission control unit 107, and transmits the advertisement packet (namely performs advertising) in accordance with the transmission power set by the transmission control unit 107.

The display control unit 109 receives the date and time data and the sensor data from the data management unit 105, and generates the display data from the display unit 110 based on the data. The display control unit 109 refers to the clock unit 103 and generates display data for displaying the date and time data held by the clock unit 103 on the display unit 110. The display control unit 109 may also generate display data for displaying the encryption setting for the sensor data (enabling/disabling encryption, encryption key or method used for encryption) on the display unit 110, or display data for displaying transmission power set in the transmission unit 108 on the display unit 110. The display control unit 109 transmits the generated display data to the display unit 110.

The display control unit 109 may receive, from the input unit 104, the user input for controlling the data display by the display unit 110. In this case, the display control unit 109 requests a specific set of date and time data and sensor data from the data management unit 105 based on the user input, or requests approximately the latest date and time from the clock unit 103, or requests the encryption setting for the sensor data or the transmission power setting in the transmission unit 108 from the transmission control unit 107.

The display unit 110 receives the display data from the display control unit 109 and displays the display data.

<Server>

Figure 12:
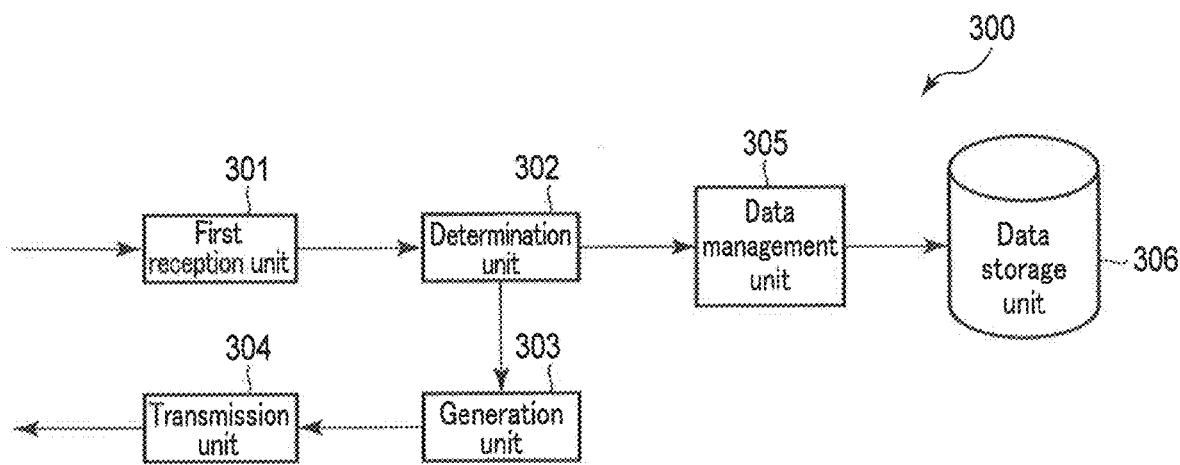
FIG. 12 is a block diagram illustrating a functional configuration of the server according to the embodiment.

Next, an example of a functional configuration of the server 300 according to the present embodiment will be described, with reference to FIG. 12. FIG. 12 schematically shows an example of a functional configuration of the server 300.

The controller 311 shown in FIG. 5 loads a program stored in the storage unit 312 on the RAM. Then, the controller 311 interprets and executes, courtesy of the CPU, the program to control each hardware element shown in FIG. 5. Thus, as shown in FIG. 12, the server 300 functions as a computer having a reception unit 301, a determination unit 302, a generation unit 303, a transmission unit 304, a data management unit 305, and a data storage unit 306.

The server 300 corresponds to a database that manages the sensor data (mainly biological data) of a number of users. The server 300 may transmit biological data of the user in accordance with the relevant access from a PC of a healthcare adviser, of a health insurance company or of a program organizer, as well as of the user himself, so as to make the biological data available for healthcare advice, assessment prior to health insurance enrollment, or grading in a health promotion program for the user.

The reception unit 301 receives a packet from the information processing apparatus 200 via a network. The reception unit 301 extracts, from the packet, the identifier indicating the information processing apparatus 200, which is the origination of the packet (hereinafter, "origination identifier"), and the data stored in a payload (for example, the identifier and/or the date and time data and the sensor data), and transmits the extracted identifier and data to the determination unit 302.

The determination unit 302 receives, from the reception unit 301, the origination identifier and the data extracted from the payload. If the data extracted from the payload includes an identifier, the determination unit 202 determines whether or not the identifier includes at least one of the following values: a first value indicating an information processing apparatus different from the information processing apparatus 200 as an origination of the received packet; a second value indicating a user different from a user of the information processing apparatus 200; or a third value indicating a sensor device different from the sensor device associated with the information processing apparatus 200. If the identifier extracted from the payload indeed includes at least one of the first value, the second value, or the third value, the determination unit 302 transmits the identifier to the generation unit 303. If not, the determination unit 302 transmits the date and time data and sensor data extracted from the payload, and the identifier associated therewith to the data management unit 305. The identifier associated with the date and time data and the sensor data may be stored in the payload of the received packet depending on the data structure of the received packet, or may need to be specified based on the origination identifier.

To realize this determination, the determination unit 302 can access a table in which the origination identifier is associated with a value of identifier indicating the information processing apparatus 200 as an origination of the received packet or the user thereof, or with a value of identifier indicating a sensor device associated with the origination information processing apparatus 200. Alternatively, in a case where a data structure not storing an identifier associated with sensor data and date and time data in a payload of a received packet is adopted, the above table may be used to specify such an identifier.

Alternatively, the information processing apparatus 200 may store a flag in a transmit packet with a value that varies between a case where the information processing apparatus 200 reports to the server 300 that an inappropriate packet is received and a case where the date and time data and sensor data gathered in the information processing apparatus 200 are uploaded onto the server 300. In this case, the determination unit 302 is able to realize the above determination by referring to such a flag.

Even if the identifier extracted from the payload includes at least one of the first value, the second value, or the third value, the determination unit 302 may transmit the identifier, the date and time data, and the sensor data to the data management unit 305, as long as the data is extracted from the payload. Although such data is the data received by the illegitimate information processing apparatus 200, the server 300 can still use it in order to compensate the loss of the data.

Upon receipt of the identifier from the determination unit 302, the generation unit 303 generates alert data for a user of the information processing apparatus 200 associated with the identifier, and packetizes the alert data before transmitting it to the transmission unit 304. Upon receipt of the identifier and the set of date and time data and sensor data from the data management unit 305, the generation unit 303 generates a packet storing thereof, and transmits it to the transmission unit 304.

The transmission unit 304 receives the packetized alert data from the generation unit 303, and transmits it to the information processing apparatus 200 via a network. The transmission unit 304 receives a packet storing the identifier, the date and time data, and the sensor data from the generation unit 303, and transmits it to any appropriate destination apparatus, such as an information processing apparatus 200 or a PC of a health care adviser, a health insurance company, or a program organizer, via a network.

The data management unit 305 receives the identifier, the date and time data and the sensor data from the determination unit 302, and writes these data items being associated with each other into the data storage unit 306. The data management unit 305 reads the identifier and the set of date and time data and sensor data stored in the data storage unit 306 in accordance with an instruction from an upper-layer application (not shown), such as an application of biological data management, and transmits the data set to the generation unit 303.

In the data storage unit 306, the identifier and the set of date and time data and sensor data are read and written by the data management unit 305.

<Others>

The function of each of the information processing apparatus 200 and the server 300 will be described later in details in the operation example. In the present embodiment, an example where each function of the sensor device 100, the information processing apparatus 200, and the server 300 is realized by a general-purpose CPU is described. However, a part or all of the functions may be realized by one or more dedicated processors. Furthermore, omission, replacement, or addition of a function can be made in the functional configuration of the sensor device 100, the information processing apparatus 200, and the server 300 as appropriate, in accordance with an actual situation where the present embodiment is realized.

3. Example of Operation

<Information Processing Apparatus>

Figure 13:
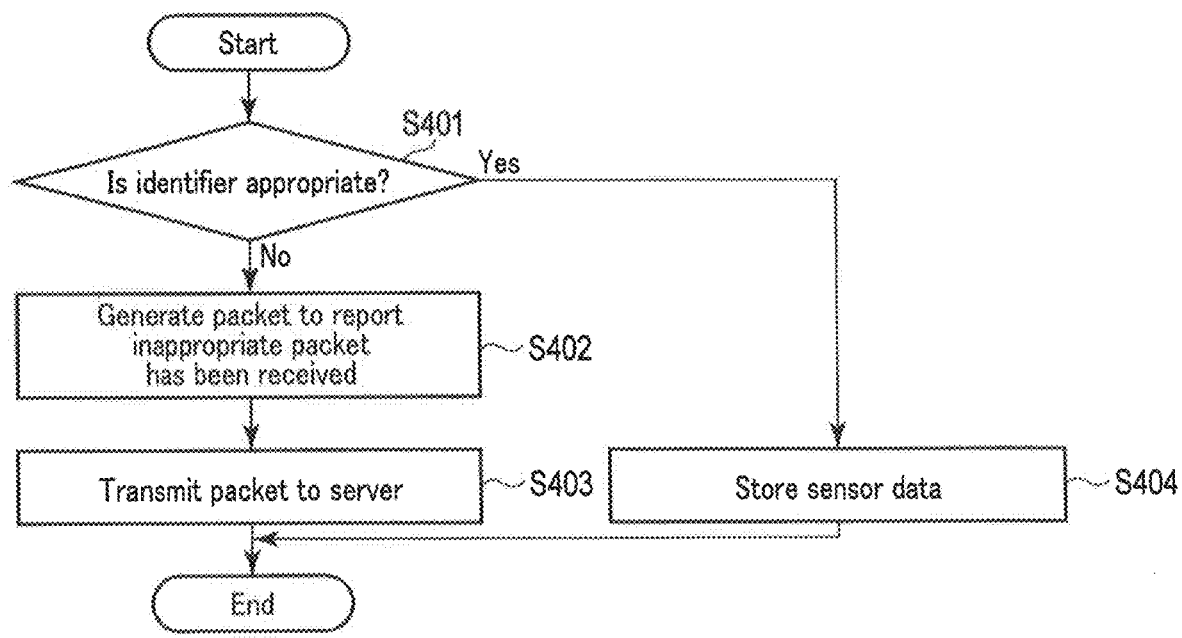
FIG. 13 is a flow chart illustrating an operation of the information processing apparatus according to the embodiment.

Next, an operation example of the information processing apparatus 200 will be described with reference to FIG. 13. FIG. 13 is a flow chart illustrating an operation example of the information processing apparatus 200. The processing procedure described hereinafter is merely an example, and the processing can be changed as far as possible. Omission, replacement, or addition of a step can be made in the processing procedure described hereinafter as appropriate, in accordance with an actual situation where the present embodiment is realized.

The operation example shown in FIG. 13 is initiated when the first reception unit 201 of the information processing apparatus 200 receives the advertisement packet of BLE from the sensor device 100 and extracts the identifier, the date and time data and the sensor data stored in the payload.

The determination unit 202 determines whether or not the identifier extracted from the received advertisement packet is appropriate, in other words whether or not the information processing apparatus 200 is an appropriate destination apparatus of the packet in the above-described manner (step S401). If the identifier is appropriate, the processing proceeds to step S404, if not, the processing proceeds to step S402.

In step S402, the generation unit 203 generates a packet storing the identifier extracted from the received advertisement packet. Then, the transmission unit 204 transmits the packet generated in step S402 to the server 300 via a network, and the processing is finished. The information processing apparatus 200 can thus report to the server 300 that an inappropriate packet has been received.

On the other hand, in step S404, the data management unit 205 writes the date and time data and the sensor data extracted from the received advertisement packet being associated with each other into the data storage unit 206, and the processing is finished.

<Server>

Figure 14:
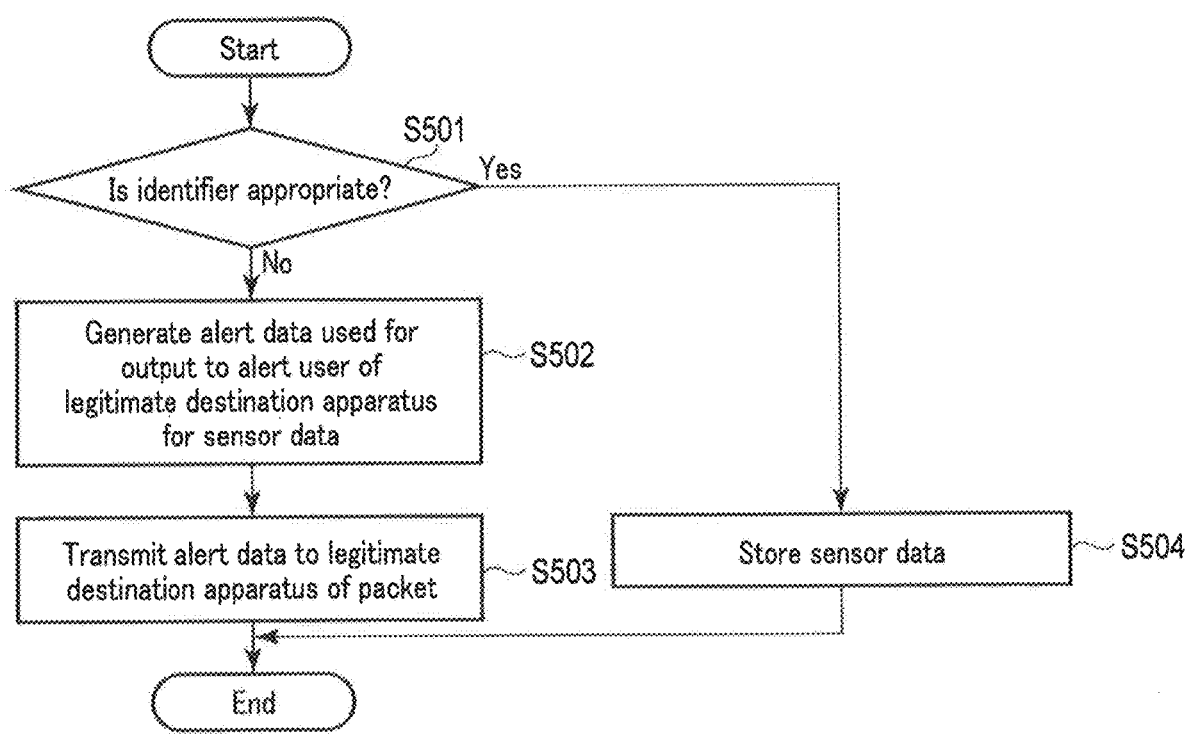
FIG. 14 is a flow chart illustrating an operation of the server according to the embodiment.

Next, an operation example of the server 300 will be described with reference to FIG. 14. FIG. 14 is a flow chart illustrating an operation example of the server 300. The processing procedure described hereinafter is merely an example, and the processing can be changed as far as possible. Omission, replacement, or addition of a step in the processing procedure described hereinafter can be made as appropriate, in accordance with an actual situation where the present embodiment is realized.

The operation example shown in FIG. 14 is initiated when the reception unit 301 of the server 300 receives the packet from the information processing apparatus 200 and extracts the origination identifier stored in the header, and the data stored in the payload.

If the data extracted from the payload includes an identifier, the determination unit 302 determines whether or not the identifier is appropriate, in other words, whether or not the information processing apparatus 200 indicated by the origination identifier reports that an inappropriate packet has been received, or uploads the date and time data and the sensor data gathered in the information processing apparatus 200 in the above-described manner (step S501). If the identifier is appropriate, the processing proceeds to step S504; if not, the processing proceeds to step S502.

In step S502, the generation unit 303 generates alert data for the user of the information processing apparatus 200 associated with the identifier extracted from the payload, and packetizes the alert data. Then, the transmission unit 304 transmits the packet generated in step S502 to the information processing apparatus 200 associated with the identifier via a network, and processing concludes at this point. Thus, it is possible for the server 300 to alert a user of the information processing apparatus 200 as a legitimate destination apparatus of a packet received by the information processing apparatus 200.

On the other hand, in step S504, the data management unit 305 writes the identifier, the date and time data, and the sensor data extracted from the received advertisement packet being associated with each other into the data storage unit 306, and the processing concludes at this point.

Advantageous Effects

As described above, in the present embodiment, an information processing apparatus receives a one-way communication packet transmitted from a sensor device, determines whether or not an identifier stored in the packet is appropriate, and if inappropriate, reports to a server in this regard. When there is such a report, the server transmits, to a legitimate destination apparatus of this one-way communication packet, alert data used for outputting an alert. Upon receipt of the alert data from the server, the information processing apparatus corresponding to a legitimate destination apparatus performs an output based on the alert data. Thus, according to the information processing apparatus and the server, even if the sensor device is equipped only with a transmission function for one-way communication, it is possible to motivate a user to take appropriate measures for the sensor device. In other words, if the sensor data is received by an illegitimate information processing apparatus, it is possible to alert a user of the legitimate destination apparatus.

4. Modifications

Although the embodiment of the present invention has been described in detail in the foregoing, the description is merely an example of the present invention in every respect. Various improvements and modifications can of course be made to the embodiment to the extent that no deviation is made from the scope of the present invention.

It should be noted, however, that the foregoing embodiment is merely an example of the present invention in every respects. Various improvements and modifications can of course be made to the embodiment to the extent that no deviation is made from the scope of the present invention. In other words, to realize the present invention, a specific structure may be adopted as appropriate in accordance with an embodiment. Data described in the present embodiment is explained in the form of natural language; however, in a real situation, the data is designated by a pseudo language, commands, parameters, or machine words, etc. recognizable for computers.

5. Additional Descriptions

Furthermore, part or all of the above-described embodiments may be described as in the additional descriptions given below; however, the embodiments are not limited thereto.

(Additional Description 1)

A data transmission system comprising:
a server;
a first information processing apparatus that communicates with the server; and
a second information processing apparatus that communicates with the server,
wherein the first information processing apparatus comprises:
a memory; and
a processor connected to the memory,
wherein the processor is configured to function as:
(a) a first reception unit that receives a first packet for a one-way communication from a sensor device, and extracts, from the first packet, sensor data and an identifier indicating an origination or a legitimate destination of the first packet;

(b) a determination unit that determines whether or not the identifier includes at least one of the following: a first value indicating an information processing apparatus different from the first information processing apparatus as the legitimate destination; a second value indicating a user different from a user of the first information processing apparatus as the legitimate destination; or a third value indicating a sensor device different from a first sensor device associated with the first information processing apparatus as the origination;

(c) a generation unit that generates a second packet in which at least one of the first value, the second value, or the third value is stored, if the identifier includes at least one of the first value, the second value, or the third value; and (d) a transmission unit that transmits the second packet to the server, wherein the server comprises:
a memory; and
a processor connected to the memory,
wherein the processor is configured to function as:
(e) a reception unit that receives the second packet from the first information processing apparatus, and extracts data stored in a payload of the second packet;

(f) a determination unit that determines, if the data stored in the payload includes an identifier, whether the identifier includes at least one of the first value, the second value, or the third value;

(g) a generation unit that generates alert data for a user of the second information processing apparatus associated with at least one of the first value, the second value, or the third value, if the identifier includes at least one of the first value, the second value, or the third value; and (h) a transmission unit that transmits the alert data to the second information processing apparatus, wherein the alert data includes data used for an output to motivate a user of the second information processing apparatus to reinforce security regarding transmission of sensor data from a second sensor device associated with the second information processing apparatus.

(Additional Description 2)
An information processing apparatus comprising:
a memory; and
a processor connected to the memory,
wherein the processor is configured to function as:
(a) a first reception unit that receives a first packet for a one-way communication from a sensor device, and extracts, from the first packet, sensor data and an identifier indicating an origination or a legitimate destination of the first packet;

(b) a determination unit that determines whether or not the identifier includes at least one of the following: a first value indicating an information processing apparatus different from the information processing apparatus as the legitimate destination; a second value indicating a user different from a user of the information processing apparatus as the legitimate destination; or a third value indicating a sensor device different from a sensor device associated with the information processing apparatus as the origination;

(c) a generation unit that generates a second packet in which at least one of the first value, the second value, or the third value is stored, if the identifier includes at least one of the first value, the second value, or the third value; and (d) a transmission unit that transmits the second packet to a server.

(Additional Description 3)
A server comprising:
a memory; and
a processor connected to the memory,
wherein the processor is configured to function as:
(a) a reception unit that receives a packet from a first information processing apparatus, and extracts data stored in a payload of the packet;

(b) a determination unit that determines, if the data stored in the payload includes an identifier, whether or not the identifier includes at least one of the following: a first value indicating an information processing apparatus different from the first information processing apparatus; a second value indicating a user different from a user of the first information processing apparatus; or a third value indicating a sensor device different from a first sensor device associated with the first information processing apparatus;

(c) a generation unit that generates alert data for a user of a second information processing apparatus associated with at least one of the first value, the second value, or the third value, if the identifier includes at least one of the first value, the second value, or the third value; and (d) a transmission unit that transmits the alert data to the second information processing apparatus, wherein the alert data includes data used for an output to motivate a user of the second information processing apparatus to reinforce security regarding transmission of sensor data from a second sensor device associated with the second information processing apparatus.

REFERENCE SIGNS LIST

100 . . . Sensor device
101 . . . Biological sensor
102 . . . Motion sensor
103 . . . Clock unit
104 . . . Input unit
105, 205, 305 . . . Data management unit
106, 206, 306 . . . Data storage unit
107 . . . Transmission control unit
108, 204, 304 . . . Transmission unit
109 . . . Display control unit
110 . . . Display unit
111, 211, 311 . . . Controller
112, 212, 312 . . . Storage unit
113, 213, 313 . . . Communication interface
114, 214, 314 . . . Input unit
115, 215, 315 . . . Output unit
116, 216, 316 . . . External interface
117 . . . Battery
200 . . . Information processing apparatus
201 . . . First reception unit
202, 302 . . . Determination unit
203, 303 . . . Generation unit
207 . . . Second reception unit
208 . . . Output unit
300 . . . Server
301 . . . Reception unit

The invention claimed is:
1. A data transmission system comprising:
a server;
a first information processing apparatus that communicates with the server; and
a second information processing apparatus that communicates with the server,
wherein the first information processing apparatus comprises a processor configured to:
receive a first packet for a one-way communication from a sensor device, and extract, from the first packet, sensor data and an identifier indicating an origination or a legitimate destination of the first packet;

determine whether or not the identifier includes at least one of the following: a first value indicating an information processing apparatus different from the first information processing apparatus as the legitimate destination; a second value indicating a user different from a user of the first information processing apparatus as the legitimate destination; or a third value indicating a sensor device different from a first sensor device associated with the first information processing apparatus as the origination;

generate a second packet in which at least one of the first value, the second value, or the third value is stored, if the identifier includes at least one of the first value, the second value, or the third value; and transmit the second packet to the server, wherein the server comprises a processor configured to:

receive the second packet from the first information processing apparatus, and extract data stored in a payload of the second packet;

determine, if the data stored in the payload includes an identifier, whether the identifier includes at least one of the first value, the second value, or the third value;

generate alert data for a user of the second information processing apparatus associated with at least one of the first value, the second value, or the third value, if the identifier includes at least one of the first value, the second value, or the third value; and transmit the alert data to the second information processing apparatus, wherein the alert data includes data used for an output to motivate a user of the second information processing apparatus to reinforce security regarding transmission of sensor data from a second sensor device associated with the second information processing apparatus.

2. An information processing apparatus communicating with a server, the information processing apparatus comprising:

a processor configured to:

receive a first packet for a one-way communication from a sensor device, and extract, from the first packet, sensor data and an identifier indicating a legitimate destination of the first packet;

determine whether or not the identifier includes at least one of the following: a first value indicating an information processing apparatus different from the information processing apparatus as the legitimate destination; or a second value indicating a user different from a user of the information processing apparatus as the legitimate destination;

generate a second packet in which at least one of the first value or the second value is stored, if the identifier includes at least one of the first value or the second value; and transmit the second packet to the server.

3. The information processing apparatus according to claim 2, the processor is further configured to:

receive alert data from the server; and perform, based on the alert data, an output for motivating a user of the information processing apparatus to reinforce security regarding transmission of sensor data from a sensor device associated with the information processing apparatus.

4. The information processing apparatus according to claim 3, wherein the alert data includes data used for an output which prompts a user input to enable encryption of the sensor data by a sensor device associated with the information processing apparatus, or change an encryption key or an encryption method used for the encryption.

5. The information processing apparatus according to claim 3, wherein the alert data includes data used for an output which prompts a user input to reduce transmission power used by a sensor device associated with the information processing apparatus to transmit the sensor data.

6. The information processing apparatus according to claim 2, wherein the sensor data includes biological data.

7. A server communicating with a first information processing apparatus and a second information processing apparatus, the server comprising:

a processor configured to:

receive a packet from a first information processing apparatus, and extract an origination identifier stored in a header, and data stored in a payload of the packet;

determine, if the data stored in the payload includes an identifier, whether or not the identifier includes at least one of the following: a first value indicating an information processing apparatus different from the first information processing apparatus; a second value indicating a user different from a user of the first information processing apparatus; or a third value indicating a sensor device different from a first sensor device associated with the first information processing apparatus;

generate alert data for a user of the second information processing apparatus associated with at least one of the first value, the second value, or the third value, if the identifier includes at least one of the first value, the second value, or the third value;

transmit the alert data to the second information processing apparatus, wherein the alert data includes data used for an output to motivate a user of the second information processing apparatus to reinforce security regarding transmission of sensor data from a second sensor device associated with the second information processing apparatus; and if the data extracted from the payload includes the identifier, determine whether or not the first information processing apparatus indicated by the origination identifier reports that an inappropriate packet has been received.

8. The server according to claim 7, wherein the alert data includes data used for an output which prompts a user input to change an encryption key or an encryption method for encryption of the sensor data by the second sensor device.

9. The server according to claim 7, wherein the alert data includes data used for an output which prompts a user input to reduce the transmission power used by the second sensor device to transmit the sensor data.

10. The server according to claim 7, wherein the sensor data includes biological data.

* * * * *